Figure 1:
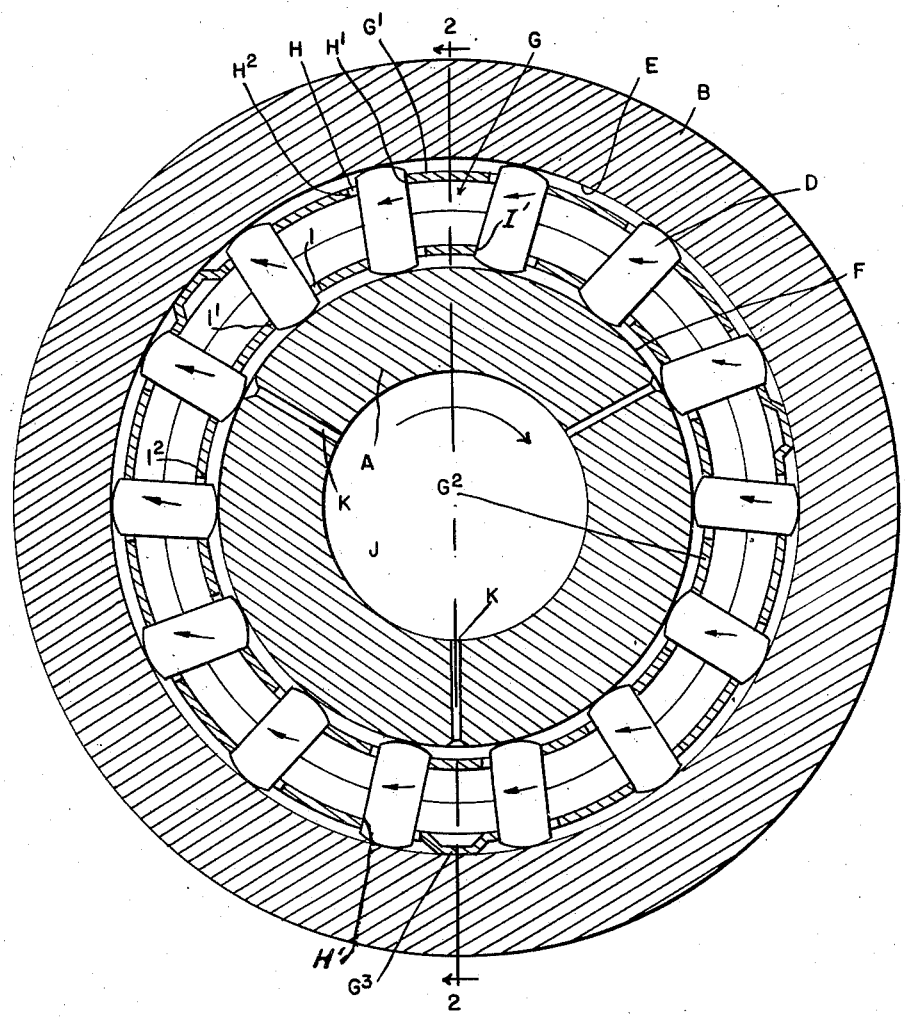

May 7, 1946.　　　J. LUND　　　2,399,749
ONE-WAY ROTARY CLUTCH
Filed Jan. 3, 1944　　　2 Sheets-Sheet 1

FIG.I.

INVENTOR.
JOHAN LUND
BY
ATTORNEYS

May 7, 1946.   J. LUND   2,399,749
ONE-WAY ROTARY CLUTCH
Filed Jan. 3, 1944   2 Sheets-Sheet 2

INVENTOR.
JOHAN LUND
BY
Whittemore Hulbert & Belknap
ATTORNEYS

Patented May 7, 1946

2,399,749

UNITED STATES PATENT OFFICE 2,399,749

ONE-WAY ROTARY CLUTCH

Johan Lund, Detroit, Mich., assignor to The Gear Grinding Machine Company, Hamtramck, Mich., a corporation of Michigan Application January 3, 1944, Serial No. 516,793

4 Claims. (Cl. 192—45.1)

The invention relates to one-way rotary clutches and more particularly to constructions designed for transmitting pulsating power. For instance, in certain types of rotary transmissions, power impulses from the driver occur in rapid succession with an interval between succeeding impulses during which the driver must be disconnected from the driven member. It is, therefore, essential that the clutch should be instantaneously connected as its action may be for only a small fraction of a second.

Another condition affecting the operation of the clutch is that it may be subjected to centrifugal force eccentric to its axis of revolution. Where this is the case the inertia of the clutching elements may interfere with instantaneous engagement.

It is the object of the instant invention to obtain a construction of rotary one-way clutch capable of instantaneous engagement and disengagement and which is unaffected by other forces such as eccentric centrifugal force. To this end the invention consists in the construction as hereinafter set forth.

Figure 2:
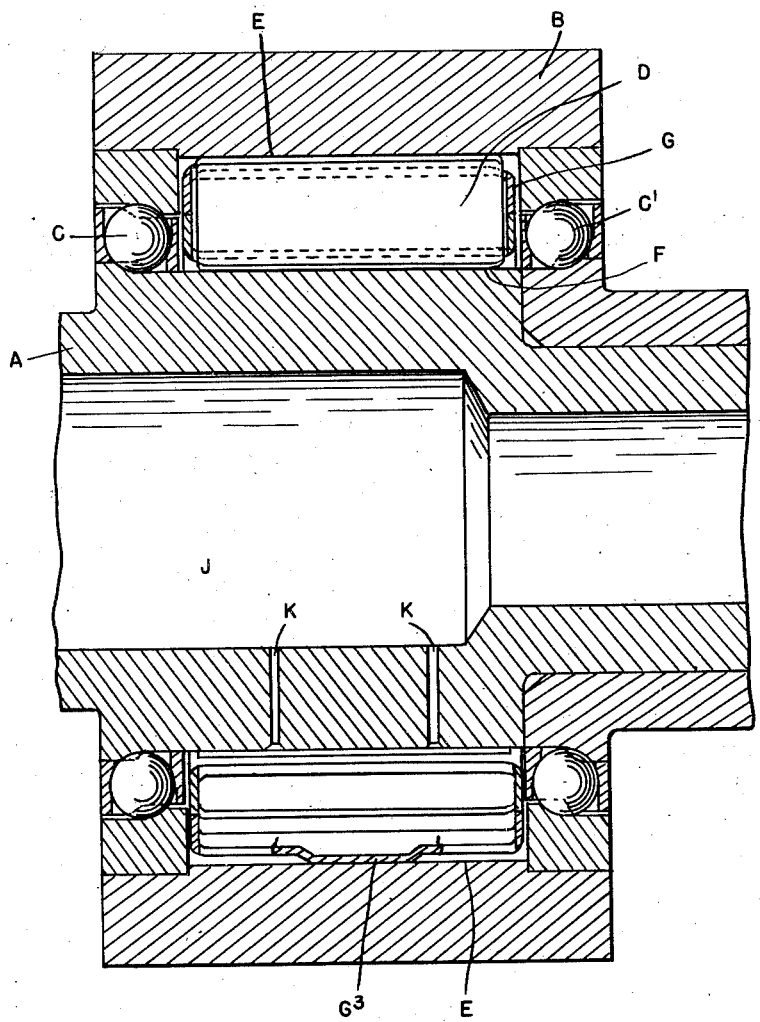

In the drawings:

Fig. 1 is a cross section through my improved clutch taken in the plane of rotation; and Fig. 2 is a longitudinal section on line 2—2, Fig. 1.

As illustrated, A is the rotary drive shaft and B a rotary driven member which is revolubly supported on the shaft A by axially spaced ball bearings C and C' leaving an annular space between said bearings. This space is occupied by a series of sprags D each of which is slightly inclined to a radius from the axis of the shaft and has its outer and inner ends in contact respectively with an internal cylindrical surface E of the member B and an external cylindrical surface F on the shaft A. Thus, when the shaft is rotating in the direction of the arrow, frictional contact with the inner ends of the sprags will tend to diminish the angle of inclination thereof and effect the coupling between the members A and B. On the other hand, if the member B should be rotated at a higher speed than the shaft A, this will instantaneously release the clutch by moving the sprags to a greater inclination.

To hold the sprags at the proper angle of inclination, I have provided a cage member G. This is preferably formed of a pair of oppositely facing outer and inner annular channel members having their parallel side flanges in contact and secured to each other being arranged respectively at opposite ends of the sprag members. The cylindrical portions G' and G$^2$ of these channel members are apertured for the passage of the sprags therethrough and are arranged respectively near the outer and inner ends of the sprags. Each aperture H in the outer cylindrical portion G' has an edge H' thereof forming a stop for limiting the inclination of the sprag, while the opposite edge H$^2$ is spaced from the sprag. In the same manner, each of the apertures I in the cylindrical portion G$^2$ has one edge I' forming a stop for limiting the inclination of the sprag and the opposite edge I$^2$ spaced from the sprag. The construction is such that the sprags are normally held at an inclination to release clutching engagement but, which, nevertheless, holds the outer and inner ends of said sprags in close proximity to the surfaces with which they respectively engage. Consequently, any rotation of the shaft A in the direction of the arrow and which is at greater speed than the rotation of the member B, will cause an instantaneous clutching engagement between these members. On the other hand, rotation of the member B at a speed in excess of that of the member A will instantaneously release the clutch.

As thus far described, it has been assumed that the only motion imparted to the clutch is about the axis of the shaft A. However, in many mechanisms there may be a simultaneous rotation about an axis eccentric to that of the clutch. This will develop centrifugal force which is indicated in the drawings by the arrows and which on one side of the axis of the shaft A (at the bottom Fig. 1) is the same as the direction of rotation, while on the opposite side of the axis (at the top Fig. 1) it is counter to the direction of rotation. If it were not for the stops H' and I', such centrifugal force would tend to release clutching engagement of the sprags on one side of the axis of the shaft, viz, on the lower side as shown in Fig. 1. However, the stop H' will arrest any movement of the lower or outer end of the sprag in the direction of the arrow, while the upper end is free to move due to the clearance between the sprag and the edge I$^2$ of the aperture I. Thus, centrifugal force will activate the sprag on this side of the clutch towards clutching engagement. On the opposite side of the clutch centrifugal force will cooperate with rotational force about the axis of the shaft to urge the sprags into clutching engagement and the stop I' will arrest movement of the inner end of the sprag. It is, therefore, apparent that with the construction described centrifugal force developed by movement about an eccentric axis will have no detrimental effect but, on the contrary, will even accelerate clutching engagement.

To hold the cage in concentric relation to the members A and B, the flange G' is provided with a plurality of radially outwardly projecting bosses G³ which contact with the cylindrical surface E of the member B.

To properly lubricate the parts during the operation of the clutch, I preferably supply lubricant under pressure to the central chamber J within the member A. From this chamber a plurality of passages K extend radially outward to feed the lubricant into the annular chamber containing the sprags. Also lubricant feeds from this chamber through the ball bearings C and C' so that all of the parts are maintained thoroughly lubricated.

What I claim as my invention is:

1. In a one-way rotary clutch coaxial revoluble inner and outer members having spaced concentric surfaces, a series of inclined sprags extending between and end-contacting with said surfaces, and a cage member for positioning said sprags and limiting the inclination thereof, said cage member having spaced cylindrical portions apertured for the passage of the sprags and forming fulcrum bearings on opposite sides of each sprag which are radially on opposite sides of the center of gravity thereof whereby centrifugal force about an axis eccentric to that of the clutch will activate each sprag towards clutching engagement.

2. In a one-way rotary clutch coaxial revoluble inner and outer members having spaced concentric surfaces the one constituting a driving and the other a driven member, a series of inclined sprags extending between and end-contacting with said surfaces, and a cage member for positioning said sprags and limiting the inclination thereof, said cage member comprising annular radial walls located at opposite ends of the sprags, cylindrical walls slightly spaced from each other and from said outer and inner members respectively being apertured for the passage of the sprags therethrough and forming fulcrum bearings on opposite sides of each sprag and on radially opposite sides of the center of gravity thereof and bearings on said cage member engaging the driven member for holding the cage in concentric relation.

3. In a one-way rotary clutch coaxial revoluble members having spaced inner and outer concentric surfaces, a series of inclined sprags extending between said surfaces, and a cage member having spaced cylindrical walls located respectively near the outer and the inner ends of said sprags and apertured for the passage of the sprags therethrough, the apertures in the two walls being relatively positioned to limit the inclination of said sprags and also to provide fulcrum bearings respectively on opposite sides thereof whereby centrifugal force about an axis eccentric to that of the clutch will activate said sprags towards clutching engagement.

4. In a one-way rotary clutch coaxial revoluble members having spaced inner and outer concentric surfaces, a series of inclined sprags extending between said surfaces, and a cage member formed of a pair of concentric respectively outwardly and inwardly facing annular channel members having the sides thereof abutting and secured to each other, the transverse portions of said channels forming cylindrical walls located respectively near the outer and inner ends of said sprags and apertured for the passage of the sprags therethrough, the apertures in the two walls being relatively positioned to limit the inclination of said sprags and also to provide fulcrum bearings respectively on opposite sides thereof whereby centrifugal force about an axis eccentric to that of the clutch will activate said sprags towards clutching engagement.

JOHAN LUND.